United States Patent [19]
Azuma et al.

[11] Patent Number: 4,581,658
[45] Date of Patent: Apr. 8, 1986

[54] VARIABLE SPEED PICTURE REPRODUCING APPARATUS FOR VIDEO TAPE RECORDER

[75] Inventors: Nobuo Azuma, Katsuta; Kenji Satoh, Yokohama, both of Japan

[73] Assignee: Hitachi, Ltd., Tokyo, Japan

[21] Appl. No.: 500,368

[22] Filed: Jun. 2, 1983

[30] Foreign Application Priority Data

Jun. 4, 1982 [JP] Japan .................. 57-94810

[51] Int. Cl.$^4$ ............................. G11B 21/10
[52] U.S. Cl. .................. 360/10.2; 360/10.1; 360/27; 360/77; 369/47
[58] Field of Search ............ 360/10.1, 27, 36.1, 360/35.1, 10.2, 18, 27, 77; 369/43, 47; 358/312

[56] References Cited

U.S. PATENT DOCUMENTS

Re. 31,160  2/1983  Kinjo .................... 369/124
3,829,892  8/1974  Nagahiro et al. .......... 360/27 X
4,361,857  11/1982  Sakamoto ............... 360/10.2 X

FOREIGN PATENT DOCUMENTS 54-66810  5/1979  Japan .................. 360/27

Primary Examiner—Robert L. Richardson
Attorney, Agent, or Firm—Antonelli, Terry & Wands

[57] ABSTRACT

A variable-speed picture reproducing apparatus for obtaining noise-free slow-motion reproduction pictures suitable for use in a helical-scanning magnetic picture recording/reproducing system in which the tracking pilot signal is recorded along with the video signal on the video track. The apparatus include a drive for transporting the tape intermittently, a detecting arrangement for detecting that the tracking error signal derived from the pilot signal picked up during the intermittent tape transportation rises or falls across a predetermined level, and a control arrangement for performing tape stop control including a reversal braking for a capstan motor of the drive upon expiration of a delay time determined by a predetermined computation following the time point of the detection of the signal level.

12 Claims, 12 Drawing Figures

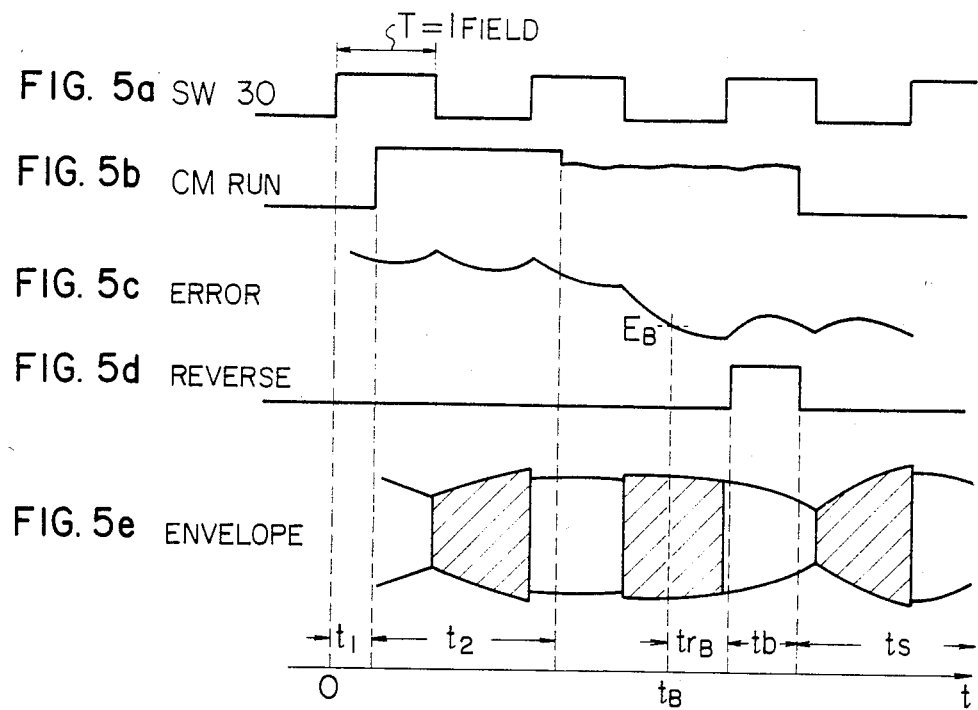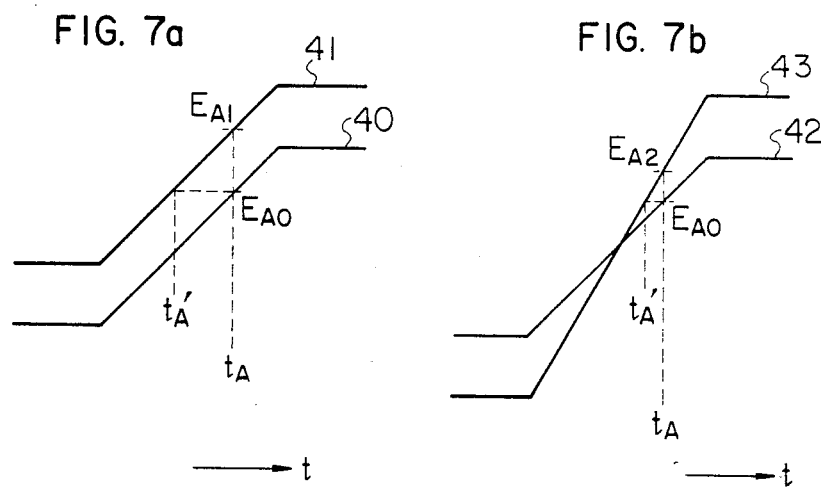

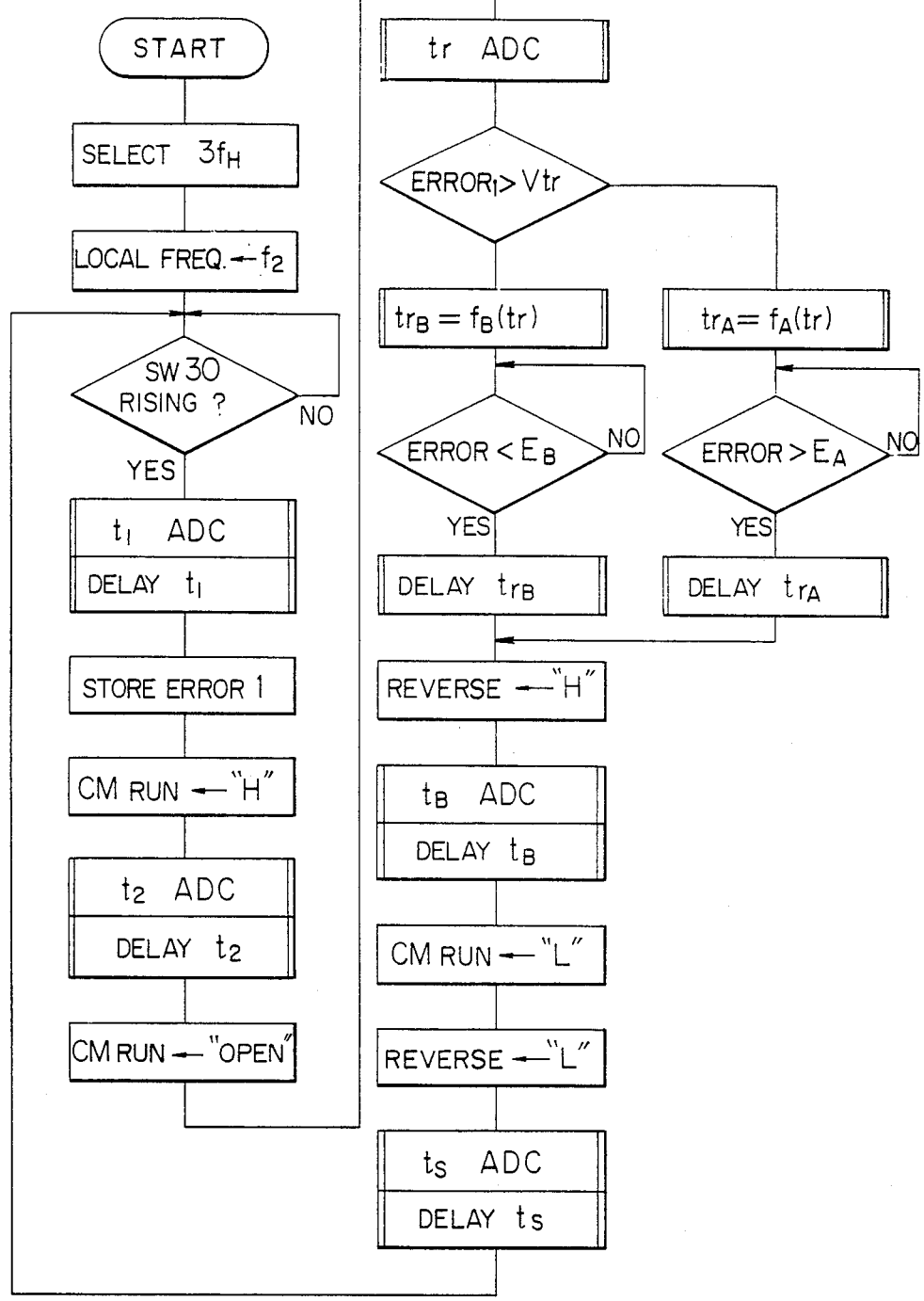

VARIABLE SPEED PICTURE REPRODUCING APPARATUS FOR VIDEO TAPE RECORDER

The present invention relates to a variable-speed picture reproducing apparatus for a video tape recorder capable of reproducing noise-free slow-motion pictures by transporting the magnetic tape intermittently and, more particularly, to a variable-speed picture reproducing apparatus capable of reproducing noise-free slow-motion pictures from a magnetic tape which does not use a separate track for recording the tracking signal, but records the tracking signal on the video signal track along with the video signal on the basis of super-imposition.

In the video tape recorder, the noise-free slow-motion reproduction is achieved by so-called intermittent tape drive wherein the tape is stopped at the optimal tracing position for the rotary head with respect to the recording track, and after the same track has been traced for a certain number of times for reproducing a still picture, the tape is driven momentarily and stopped at a position where a noise-free still picture on a following track is reproduced, and these operations are repeated cyclically.

The intermittent tape drive for stopping the tape at each optimal position for still picture reproduction can readily be achieved by using a control signal recorded on the control track located at the marginal portion of the tape. Namely, the control signal recorded on the control track has a fixed positional relationship with the video track for recording the video signal, and accordingly, by stopping the tape on a certain condition after the control signal has been detected, the rotary head can trace the optimal position on the video track.

However, for a video tape recorder of the type wherein the above-mentioned control track for the tracking servo control is not used, but instead, pictures are recorded and reproduced basing on a synchronizing signal (pilot signal) recorded along with the video signal on the video track (this method will be called "pilot system" hereinafter), a signal for immediately determining the video track position is not available, and therefore, the above-mentioned method cannot be used for reproducing noise-free slow-motion pictures.

It is an object of the present invention to provide a video tape reproducing apparatus which automatically controls the tape stop position in the intermittent tape drive operation for the video tape recording/reproducing system wherein the control track is not provided, but instead, a tracking pilot signal is recorded along with the video signal on the video track.

In order to achieve the above object, the invention resides in the circuit arrangement which monitors the tracking error signal derived from the pilot signal which is picked up on the video track, and performs tape stop control including capstan reversal braking upon expiration of the first delay time determined by a certain computation when the error signal is above the predetermined level, or upon expiration of the second delay time determined by a certain computation when the error signal is below another predetermined level. It is also possible to modify the above-mentioned threshold level or delay time by using the maximum and minimum values of the tracking error signal thereby to enhance the accuracy of the tape stop position.

The above-mentioned computation can readily be performed by use of a microprocessor.

The present invention will be apparent from the following detailed description taken in conjunction with the accompanying drawings, in which:

FIGS. 5a to 5e are timing charts explaining the operations of the embodiment;

FIG. 6 is a flowchart showing the operation carried out by one embodiment of the present invention; and FIGS. 7a and 7b are waveform diagrams explaining the operations of a modified embodiment wherein the error signal "ERROR" is modified by the maximum and minimum values of the error signal.

Figure 1:
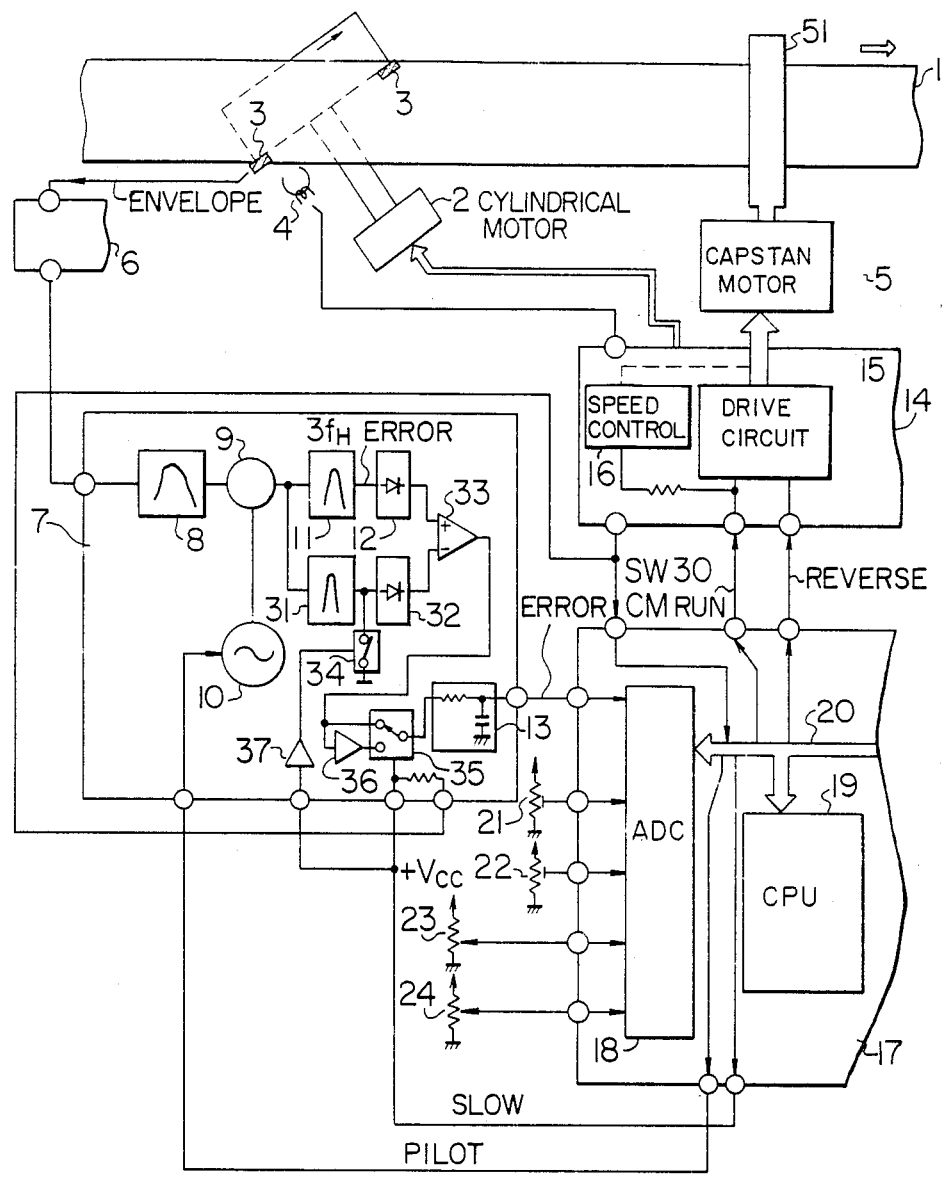
FIG. 1 is a block diagram showing the principal portions of the variable-speed picture reproducing apparatus according to the present invention.

In FIG. 1 showing the principal portions of the inventive variable-speed picture reproducing apparatus, a magnetic tape 1 is transported by a capstan 51 which is driven by a capstan motor 5 during the recording or reproducing operation. The magnetic tape 1 is recorded or reproduced by a rotary video head 3 which is rotated by a cylindrical motor 2. The capstan motor 5 and cylindrical motor 2 are controlled for their rotational speed and phase by a servo circuit 14. A tach head 4 detects the angular position of the rotary video head 3, and is arranged, for example, for picking up the magnetic flux of a magnet (not shown) rotating along with the rotary video head. The signal produced by the tach head 4 is supplied to the servo circuit 14 and used for controlling the rotational speed and phase of the cylindrical motor 2. For the arrangement having two rotary video heads 3, as shown in the figure, the tach signal is used to produce a video head switching signal (signal SW30).

In reproducing pictures recorded on the magnetic tape 1, the signal picked up by the rotary video head 3 is subjected to the known process by a signal processing circuit 6 so that it is transformed into the video signal to be supplied to a picture display unit (not shown). The signal processing circuit 6 also extracts a low frequency component from the reproduced signal and supplies it to a tracking error signal processing circuit 7. The tracking error signal processing circuit 7 generates a tracking error signal for tracking the rotary video head by using pilot signals in four separate frequencies. The tracking error signal is supplied to a microcomputer 17 for producing a signal which controls the servo circuit 14. The servo circuit 14 comprises at least a drive circuit 15 for the capstan motor 5 and a speed control circuit 16. The microcomputer 17 may be of a single package type consisting at least of an analog-to-digital converter (ADC) 18, a central processing unit (CPU) 19, and a bus line 20, and may be used by being accommodated in one chip, for example.

The principle of the invention will now be described with reference to FIGS. 1 and 2. This embodiment employs pilot system as a tracking control method wherein four pilot signals are used. The frequencies of the four pilot signals are chosen, for example, to be $f_1 = 6.5f_H$, $f_2 = 7.5f_H$, $f_3 = 10.5f_H$, and $f_4 = 9.5f_H$ where $f_H$ is the frequency of the horizontal sync signal. These pilot signals are switched and recorded for each field in the order of $f_1$, $f_2$, $f_3$ and $f_4$.

In the normal reproducing operation, the signal "PILOT" provided by the microcomputer 17 for controlling the operation of a local signal generator 10 is made "low" by a signal from an operational mode selection means (not shown), so that the local frequency which is equal to one of the pilot frequencies recorded on the tape is switched in the order of $f_1$, $f_2$, $f_3$, $f_4$, $f_1$, and so on. The reproduced pilot signal supplied to the tracking error signal processing circuit 7 and extracted by a band pass filter 8 is mixed by a mixer 9 with the output of the local signal generator 10 whose frequency is switched sequentially. The output of the mixer 9 is connected to band pass filters 11 and 31 which selectively pass only respective differential frequencies between the pilot signal and the local signal. The band pass filter 11 conducts the frequency of $3f_H$, while the band pass filter 31 conducts the frequency of $1f_H$. The outputs of the band pass filters 11 and 31 are detected by detectors 12 and 32, respectively, then supplied to a comparator 33 for producing the tracking error signal.

Reference number 36 denotes an inverting amplifier which inverts the polarity of the tracking error signal. A switch 35 operated at each field by the head switching signal SW30 provided by the servo circuit 14 has one contact supplied with the inverted tracking error signal via the inverting amplifier 36 and another contact supplied with non-inverted tracking error signal, thereby obtaining a tracking error signal whose polarity is reversed at every field. This process is needed because the pilot signal is switched at every track in recording, and therefore the relation between the direction of tracking deviation and the polarity of tracking error signal is reversed at every track, that needs to be corrected. The tracking error signal from the switch 35 is smoothed by a low pass filter 13 as in the case of the usual phase control system, and then the final error signal "ERROR" is produced. The principle of tracking control in pilot system during the normal reproducing operation is known in the field of art, and further explanation will be omitted.

Figure 3:
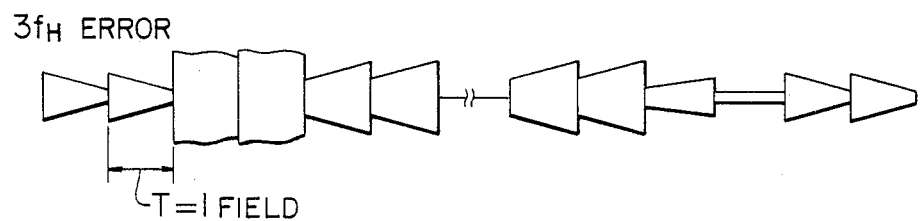
FIG. 3 is a waveform diagram showing an example of the $3f_H$ component of the tracking error signal.
Figure 4:
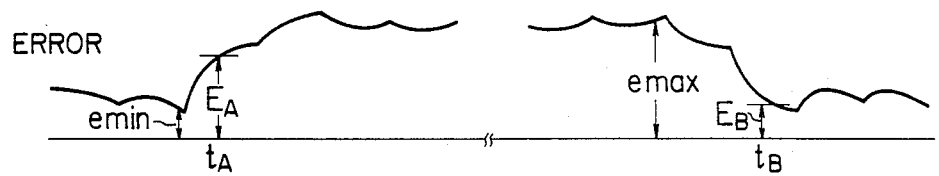
FIG. 4 is a waveform diagram showing the detected and smoothed error signal.

The following describes the slow-motion picture reproducing operation which the present invention deeply concerns. In the slow-motion picture reproducing operation, the slow-motion reproduction command signal "SLOW" issued by the microcomputer 17 to the tracking error signal processing circuit 7 makes a transition from an "open" state to a "high" state, causing the switch 35 to be set fixedly as shown in the figure and a switch 34 to be turned on through a buffer 37. The PILOT signal for controlling the local signal generator 10 goes "high" so that the output frequency is fixed, for example, to $f_2$ (i.e., $7.5f_H$). FIG. 2 shows an example of recorded tracks, and wherein $f_1$, $f_2$, $f_3$, $f_4$, $f_1$, and $f_2$ indicate that these tracks have recorded pilot signals with respective frequencies in advance. Hatched portions A, B and A are parts of traces of the rotary video heads when they scan the same tracks repeatedly at each stoppage of the tape during the intermittent tape drive. Since the $1f_H$ component of the tracking error signal is grounded through the closed switch 34, only the $3f_H$ component via the band pass filter 11 is detected. Consequently, the largest error signal is produced when the head traces a track recording $f_3$ ($10.5f_H$) FIG. 3 shows an example of the variation in the $3f_H$ component of the tracking error signal arising during a transition a from the tape stoppages A to B. As the tape moves and the rotary head makes a trace across the track where the pilot signal of $f_2$ ($7.5f_H$) equal to that of the local signal is recorded, the error signal of $3f_H$ increases sharply as shown in the figure. This signal is detected by the detector 12, conducted through the comparator 33 receiving a zero level at its another input, and further conducted through the switch 35 with its contacts fixed as shown in FIG. 1 to the low pass filter 13, by which the signal is smoothed as shown in FIG. 4. Accordingly, by running the tape for a predetermined duration from a time point $t_A$ at which the "ERROR" signal has exceeded a predetermined threshold $E_A$, it can be stopped at position B where the next noise-free still picture can be reproduced. Running of the specified length of tape can specifically be accomplished by the control of the microcomputer 17 such that the tape is stopped after a predetermined first delay time following $t_A$. Variable resistors 21–24 are provided for the adjustment of the delay time and other parameters controlled by the microcomputer 17. During a transition from stoppage B to the next stoppage A, the head does not trace the track where the pilot signal of $f_3$ is recorded, and therefore, the tracking error signal of $3f_H$ and its detected, smoothed "ERROR" signal vary as shown on the right hand side of FIGS. 3 and 4, respectively. The tape transportation is controlled such that a time point $t_B$ at which the "ERROR" signal falls below a predetermined threshold $E_B$ is detected and the tape is stopped on expiration of a predetermined second delay time in the same way as of the previous case. Thus, noise-free slow-motion pictures can be reproduced by running the tape frame by frame intermittently and reproducing a still picture at each tape stoppage.

The provision of a fixed local signal frequency and differential frequency to be detected in the inventive intermittent tape drive control for reproducing slow-motion pictures, when compared with the conventional tracking control based on the switching of the local signal frequency, allows the better control performance because the system is not affected by the error caused by the variation of signal level due to the switching.

Although in the foregoing tape drive control the first or second delay time is calculated by the microcomputer 17 basing on the time point at which the "ERROR" signal has risen or fallen across a certain threshold level, it is also possible to perform control by provision of a fixed delay time and determination of the threshold level $E_A$ or $E_B$ by calculation of the microcomputer 17.

The following describes in detail the specific operation of one embodiment of the present invention with reference to the timing charts shown in FIG. 5 and the flowchart shown in FIG. 6. The timing charts of FIGS. 5a to 5e show the transient operation b from the stoppage B to the stoppage A shown in FIG. 2.

First, when the video tape recorder is set to the mode of variable-speed picture reproduction under intermittent tape drive, the microcomputer 17 puts its SLOW output "high" so that the switch 34 is closed, thereby detecting only tracking error signal of $3f_H$. This signal is detected and smoothed to form the error signal "ERROR". The microcomputer 17 brings the "PILOT" signal for controlling the local signal generator 10 to "high" so that the local signal frequency is fixed to $f_2$ ($7.5f_H$) Next, the microcomputer 17 stores the value of the "ERROR" signal at a time point following a delay time $t_1$ behind the rising edge of the head switching signal SW30 (FIG. 5a) into its RAM as a data ERROR 1. The delay time $t_1$ (start time parameter) is set on the variable resistor 21 and fed through the AD (Analog-to-Digital) converter 18 to the microcomputer 17. Other parameters set on the variable resistors 22–24 are fed through the AD converter 18 to the microcomputer 17.

Subsequently, the microcomputer 17 brings the signal "CM RUN" for controlling the driver 15 in the servo circuit 14 for the capstan motor 5 to "high" so the capstan motor 5 is driven at the high speed, and upon expiration of a delay time t2 the microcomputer 17 puts the "CM RUN" "open" so as to switch the servo circuit 14 through the speed control circuit 16 to the speed control mode in which the capstan motor 5 is driven at the normal speed. Then, the microcomputer 17 reads the tracking adjustment value $t_r$ set on the external manual tracking adjustment variable resistor 23 (this setting device is not always necessary).

Figure 2:
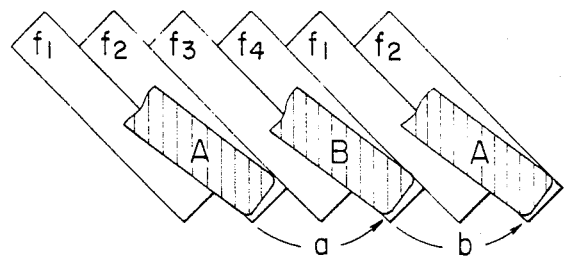
FIG. 2 is an illustration explaining the relationship between the video track and the trace of the rotary head during the tape stoppage.

At this point, if the process branches into two paths as shown in FIG. 6 and the stored value "ERROR 1" is larger than a threshold level $V_{th}$ (e.g., it is set to one-half of the power voltage $V_{CC}$), it is determined that this is operational mode b for moving the tape from the stoppage B to the stoppage A as shown in FIG. 2, and thereafter the level of the "ERROR" signal is always checked and a delay time of $t_{rB}$ is produced basing on the time point $t_B$ at which the signal level has fallen below $E_B$. The delay time $t_{rB}$ is calculated from a function $f_B$ specified to mode b using a setup value $t_r$ on the manual tracking variable resistor. As a simple example, the delay time may be determined as $t_{rB}=t_r$ and $t_{rA}=t_r+t_A$ (where $t_A$ is a fixed offset). For example, when the invention is applied to a VHS type video tape recorder with the standardized tape speed, rotary head cylinder and track pitch, the delay time may be set to $t_{rB}=t_r=10$ ms, $t_A=14$ ms and $t_{rA}=24$ ms.

Upon expiration of the delay time $t_{rB}$, the microcomputer 17 brings the reversal braking signal "REVERSE" for stopping the capstan motor to "high" for a duration of delay time $t_b$ determined by the brake time setting variable resistor 22, then puts "CM RUN" "low" and "REVERSE" "low" to make the capstan motor 5 completely stop. At this time, a noise-free still picture can be reproduced, and by the iteration of this operation, noise-free slow-motion pictures can be reproduced. The frame rate of the slow-motion picture reproduction by the intermittent drive operation can be varied by changing the setup of $t_s$ on a variable resistor for setting the slow speed 24, and the noise-free slow-motion reproduction of the range from zero (still) to ⅓ times of the normal reproduction speed is possible.

In addition, by continuing the still picture reproduction without setting $t_s$ and by running the tape for one frame whenever the command signal is issued, which is followed by another still picture reproduction, a "frame-by-frame" reproduction can be realized merely by modifying the program such that the loop in the flowchart shown in FIG. 6 is executed once at each command input.

The accuracy of the tape stop position of the magnetic tape according to the inventive intermittent drive operation can be enhanced in the following way.

The tracking error signal "ERROR" will have a different amplitude and DC level depending on the video tape recorder and tape which are used. On this account, the maximum value $e_{max}$ and minimum value $e_{min}$ of "ERROR" obtained at the stoppage of the tape as shown in FIG. 4 are read at a fixed phase through the AD converter with reference to the head switching signal SW30 and stored in the RAM. Then, the predetermined threshold level $E_A$ or $E_B$ is modified in accordance with the stored $e_{max}$ and $e_{min}$. This modification can be carried out, for example, by the following computation.

$$E_A = e_{max} - 0.25(e_{max} - e_{min})$$

$$E_B = e_{min} + 0.25(e_{max} - e_{min})$$

The positioning accuracy can further be improved by taking other parameters into consideration for the modification of the threshold levels, or it can be reflected by other information than the maximum and minimum values of "ERROR". Such rearrangement can readily be realized by the apparatus incorporating a microcomputer.

The modification by the maximum and minimum values of "ERROR" is not limited to the method of modifying the detecting levels $E_A$ and $E_B$, but a method of modifying the delay time $t_{rA}$ and $t_{rB}$ can readily be realized. The method of modification may be chosen appropriately depending on the recording/reproduction system of each video tape recorder and its standards.

It is explained as follows by FIGS. 7a and 7b that the time points $t_A$ and $t_B$ become constant by such a modification even if there occurs any variation of the waveform of the "ERROR" signal.

FIG. 7a shows that the DC level of the "ERROR" signal 40 is shifted to form a new waveform 41. In this case, if the threshold level $E_A$ is unchanged as $E_{A0}$, the time point $t_A$ will move to $t_A'$, resulting in an error in the tape stop position. On the other hand, if modification is made according to $E_A = e_{max} - 0.25(e_{max} - e_{min})$, as $E_{A0}$ is modified to $E_{A1}$, the time point $t_A$ does not vary.

FIG. 7b shows that the amplitude of the "ERROR" signal 42 increases to form a new waveform 43. Also in this case, if the threshold level $E_{A0}$ is unchanged, the time point $t_A$ is moved to $t_A'$, whereas by modification according to $E_A = e_{max} - 0.25(e_{max} - e_{min})$, $E_{A0}$ is modified to $E_{A2}$ and the time point $t_A$ does not vary.

In the same way as described above, the time point $t_B$ can also be fixed.

We claim:

1. A variable-speed picture reproducing apparatus for a helical-scanning magnetic tape recording/reproducing system for which a tracking pilot signal is recorded along with a video signal on a video track, said apparatus comprising:
   means for intermittently moving a magnetic tape;
   means for picking up said pilot signal recorded on the tape and for producing a tracking error signal in accordance therewith;
   means for detecting the level of the tracking error signal obtained during the movement of the tape; and
   means responsive to the detected level of the tracking error signal for stopping the movement of the tape, said tape stopping means including means for detecting a time point at which the detected level of the tracking error signal rises above a predetermined level or falls below a predetermined level and for stopping the movement of the tape after a delay time following the detection of the time point at which the detected signal level rises above the predetermined level or falls below the predetermined level, said delay time being determined in accordance with a predetermined relation.

2. A variable-speed picture reproducing apparatus according to claim 1, wherein said means for detecting the level of the tracking error signal includes means for, during a variable-speed picture reproduction, setting the frequency of a signal generated by a local signal generator to one of plural frequencies, which during a normal picture reproduction, would be switched in a predetermined order as in a recording operation for generating the tracking error signal, and for detecting the level of a tracking error signal in accordance with only said one set frequency.

3. A variable-speed picture reproducing apparatus according to claim 2, wherein said tape stopping means further includes means for detecting maximum and minimum values of the tracking error signal and for modifying the detection level of the tracking error signal in accordance with the detected maximum and minimum values.

4. A variable-speed picture reproducing apparatus according to claim 2, wherein said tape stopping means further includes means for detecting maximum and minimum values of the tracking error signal and for modifying said delay time in accordance with the detected maximum and minimum values.

5. A variable-speed picture reproducing apparatus according to claim 2, wherein said tape stopping means enables stopping of the movement of the tape upon at least one of expiration of a first delay time following the time point at which the detected tracking error signal level rises above a first predetermined level and expiration of a second delay time following the time point at which the detected tracking error signal level falls below a second predetermined level, said first delay time being determined in accordance with a predetermined relation, and said second delay time being determined in accordance with a predetermined relation.

6. A variable-speed picture reproducing apparatus according to claim 5, further comprising means for storing a previous tracking error signal detected before the start of tape movement, and means for controlling said tape stopping means so that said tape stopping means detects the time point at which the stopping means detects the time point at which the detected signal level of the tracking error signal falls below said second predetermined level when the tracking error signal is larger than the predetermined level, or detects the time point at which the signal level of the tracking error signal rises above the first predetermined level when the tracking error signal is smaller than said predetermined level.

7. A variable-speed picture reproducing apparatus according to claim 6, wherien said tape stopping means further includes means for detecting the maximum and minimum values of said stored previous tracking error signal and for modifying said first and second predetermined levels in accordance with the detected maximum and minimum values.

8. A variable-speed picture reproducing apparatus according to claim 6, wherein said tape stopping means further includes means for detecting the maximum and minimum values of said stored previous tracking error signal and for modifying said first and second predetermined levels in accordance with the detected maximum and minimum values.

9. A variable-speed picture reproducing apparatus according to claim 1, wherein said tape stopping means further includes means for detecting maximum and minimum values of the tracking error signal and for modifying the detection level of the tracking error signal in accordance with the detected maximum and minimum values.

10. A variable-speed picture reproducing apparatus according to claim 1, wherein said tape stopping means further includes means for detecting maximum and minimum values of the tracking error signal and for modifying said delay time in accordance with the detected maximum and minimum values.

11. A variable-speed picture reproducing apparatus according to claim 1, wherein said tape stopping means enables stopping of the movement of the tape upon at least one of expiration of a first delay time following the time point at which the detected tracking error signal level rises above a first predetermined level and expiration of a second delay time following the time point at which the detected tracking error signal level falls below a second predetermined level, said first delay time being determined in accordance with a predetermined relation, and said second delay time being determined in accordance with a predetermined relation.

12. A variable-speed picture reproducing apparatus according to claim 11, further comprising means for storing a previous tracking error signal detected before the start of tape movement, and means for controlling said tape stopping means so that said tape stopping means detects the time point at which the stopping means detects the time point at which the detected signal level of the tracking error signal falls below said second predetermined level when the tracking error signal is larger than the predetermined level, or detects the time point at which the signal level of the tracking error signal rises above said first predetermined level when the tracking error signal is smaller than said predetermined level.

* * * * *